Figure 4:
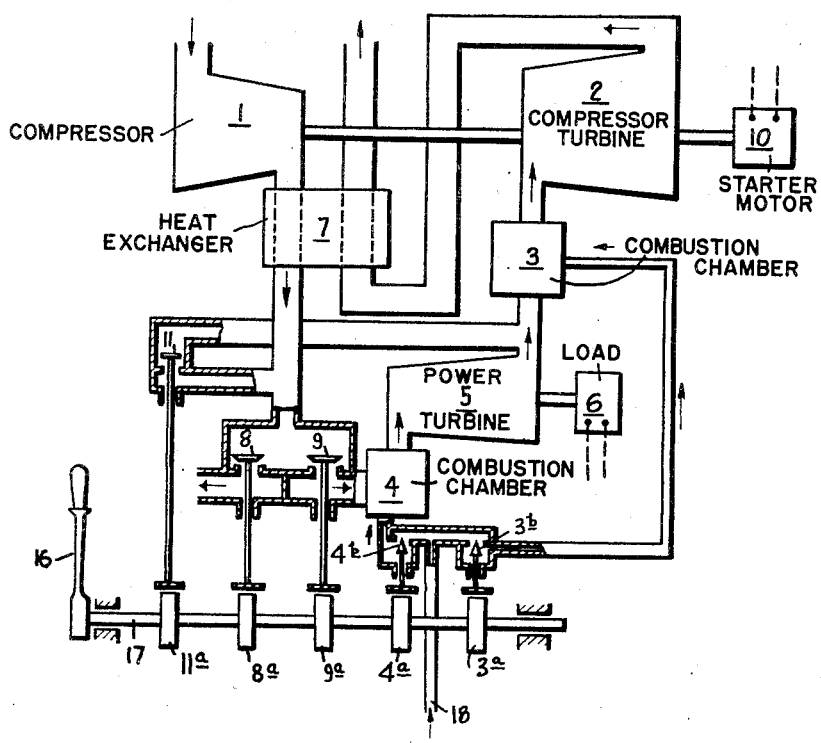

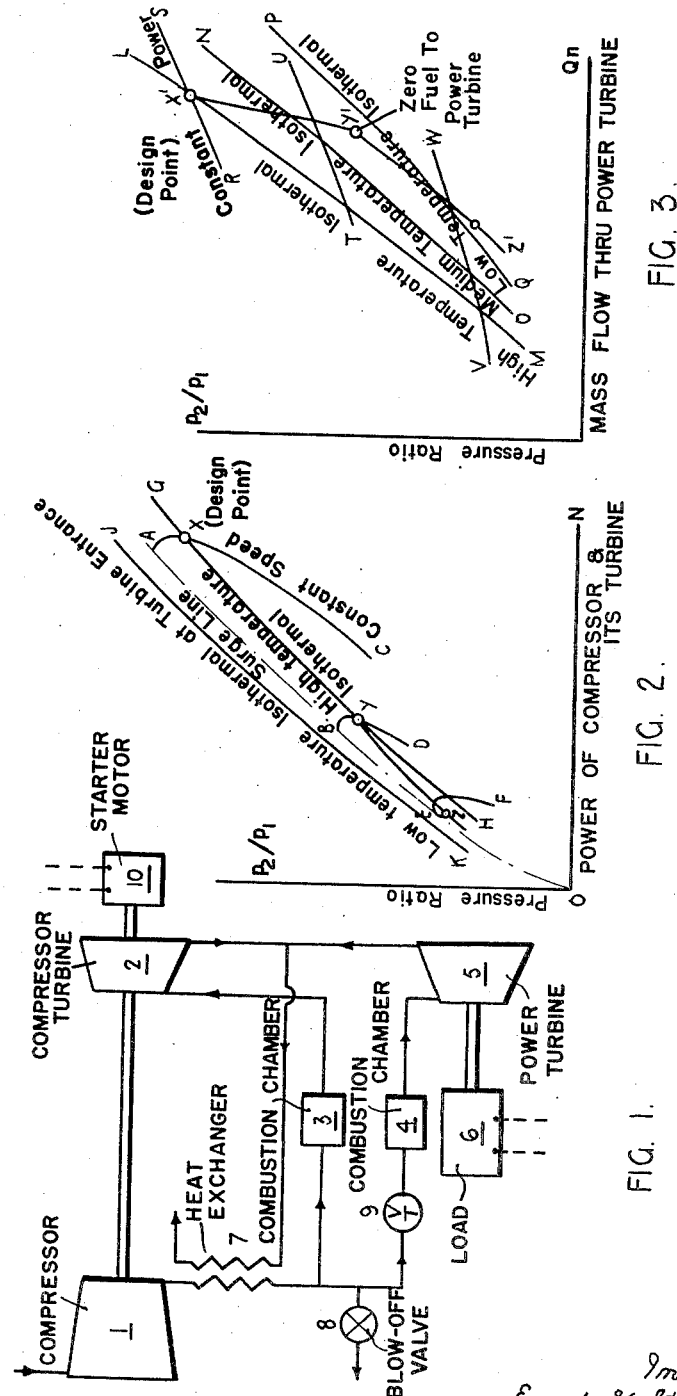

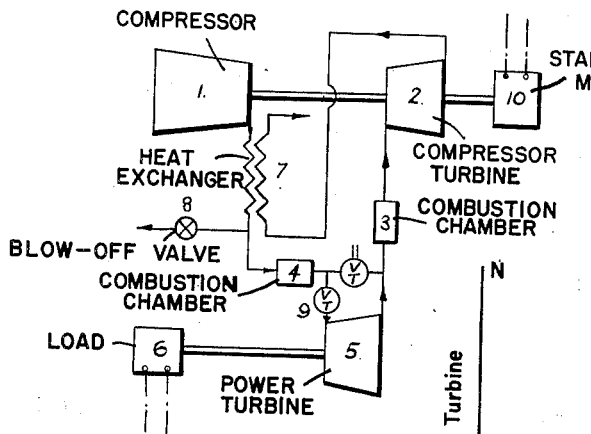
FIG 1.ª
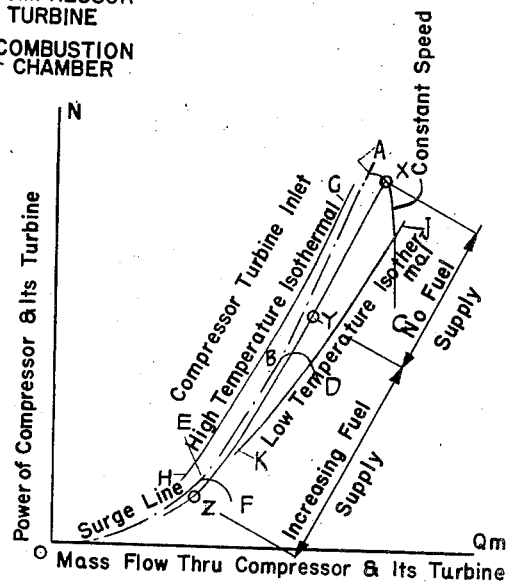
FIG 2.ª
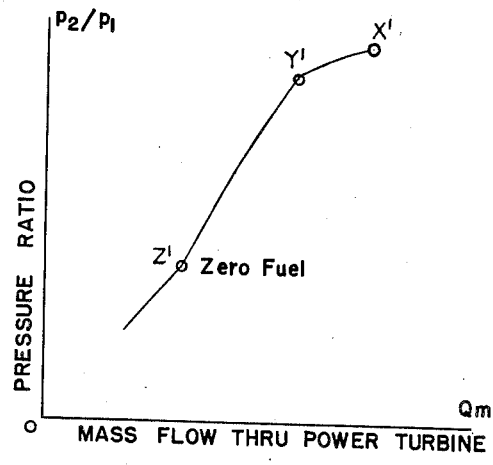
FIG 3.ª

Patented Sept. 15, 1953

2,651,911

UNITED STATES PATENT OFFICE 2,651,911

POWER PLANT HAVING A COMMON MANUAL CONTROL FOR THE FUEL VALVES OF THE COMPRESSOR AND POWER TURBINES

Ernest George Sterland, Rugby, England, assignor to The English Electric Company Limited, London, England, a British company Application December 3, 1946, Serial No. 713,678
In Great Britain December 13, 1945

2 Claims. (Cl. 60—39.15)

This invention relates to a gas turbine power plant in which two turbines, each having its own combustion chamber in its inlet, are arranged to receive their compressed air supplies from a single compressor, and are mechanically independent, one being coupled to drive the compressor and the other supplying useful external power. The invention is limited to a power plant in which the compressor is of a type which is liable to surge if it is prevented from delivering a certain minimum mass flow, the value of which is dependent upon speed. Such a compressor has in operation always a clear path for the flow of gas in either direction, and will be referred to as a dynamic or non-positive displacement compressor. The axial flow and centrifugal types of compressor exhibit this characteristic.

The term "compressor" is used in this specification to include an arrangement of a plurality of compressors operating in series and/or parallel, and mechanically coupled together. The term "turbine" is used to include the possible, though unusual, arrangement of a plurality of mechanically coupled turbines operating in series and/or parallel but without intermediate combustion chambers.

The invention is applicable both to turbines in parallel flow and to turbines in series flow arrangement. In the latter case the low pressure turbine is coupled to drive the compressor, and the high pressure turbine is supplying useful external power.

It has already been proposed to use for controlling such gas turbine plant control means common to the whole plant. For example, in a parallel flow arrangement a manometric device tending to equalize the pressure in the supply pipes to the two turbines was proposed to act on a throttle valve in the inlet to the common compressor, so as to reduce the cross section at the said inlet when the pressure in the supply pipe to the power turbine drops below that in the supply pipe to the compressor turbine as a consequence of a throttle valve in the supply pipe to the power turbine being partly closed by a speed governor in response to a rise of speed of said power turbine. Here the common control member acts, as stated, on an inlet throttle of the common compressor.

It has also been proposed to control the fuel supply valves of the separate combustion chambers of two turbines working in parallel flow arrangement, by a centrifugal governor driven by the compressor turbine and acting as a common control means on the fuel supply of both combustion chambers. However, there is another common control means constituted by a centrifugal governor driven by the power turbine, adapted to override and to effect a more accurate control than the first mentioned control both tending to maintain constant speed, and accordingly there is no definite position of each of the said fuel control valves determined by the position of either of the two centrifugal governors. A third overriding common control means in this arrangement may be constituted by a pressure responsive means exposed to the pressure of the fuel supply to the combustion chamber of the power output turbine, and a fourth manually operated overriding control may allow to vary the speed setting of the plant. In any case the object of this arrangement is to maintain the speed, to which the plant is set, constant under varying loads.

As distinguished therefrom, the invention is directed to the problem of preventing surging of the compressor when the power required from the power turbine is reduced.

A gas turbine plant according to the present invention includes at least two turbines, of which one provides useful external power whilst the other is adapted to drive a dynamic compressor supplying gaseous working fluid through heating devices to the said turbines; the fuel supply to the said heating devices being under the influence of separate control valves operable by a single common control including positively acting control means adapted to engage the said valves so that each position of said single common control means determines one position and one only of each of the said valves, one of said valves controlling the fuel supply to the heating device in supply connection with the external power providing turbine and the other controlling the fuel supply to the heating device in supply connection with the compressor turbine, the said control device being adapted to provide, when desired, a progressive decrease in the power output of the plant from maximum power downwards by first reducing progressively the fuel supply to the heating device in supply connection with the external power producing turbine, whilst regulating the remainder of the fuel supply to maintain substantially constant the gas inlet temperature of the turbine driving the compressor, and thereafter progressively reducing the total fuel supply to reduce the said gas inlet temperature.

According to the parallel flow arrangement, the said single common control device for the combustion chambers of both turbines is adapted to regulate the power output of the power turbine by first reducing gradually down substantially to zero the fuel supply to the combustion chamber of the power turbine while maintaining the temperature of the compressor turbine input at least approximately as high as at full power of the power turbine, and thereafter reducing gradually the temperature of the compressor turbine input.

According to the series flow arrangement, the said single common control device for regulating the power output of the power turbine is effective at full power to supply fuel substantially to the power turbine combustion chamber only, and then, as power is reduced, successively: (a) for the range from full power down to about three-quarters of full power to supply gradually decreasing quantities of fuel substantially to the power turbine combustion chamber only, (b) for the range from about three-quarters of full power downwards to continue gradually decreasing the fuel supply to the power turbine combustion chamber while simultaneously gradually increasing from substantially zero a fuel supply to the compressor turbine combustion chamber, until the fuel supply to the power turbine combustion chamber reaches substantially zero at about 15% of full power, and (c) thereafter gradually to decrease the fuel supply to the compressor turbine combustion chamber.

In order to be better understood and readily carried into effect, the invention is illustrated by way of example in the accompanying drawings.

Fig. 1 shows diagrammatically a parallel flow plant to which the invention can be applied.

The performance of such plant is shown graphically in Figs. 2 and 3. Fig. 2 shows a graph drawn for the compressor 1 and its driving turbine 2. The ordinates represent pressure ratio while the abscissae represent compressor power (i. e. output power of the turbine 2 or input power to the compressor 1, these powers being equal). In Fig. 3, which is drawn for the power turbine 5, the ordinates represent pressure ratio and the abscissae mass flow for the power turbine.

Fig. 1a shows diagrammatically a series flow plant to which the invention can be applied.

The performance of such plant is shown graphically in Figs. 2a and 3a. Fig. 2a shows a graph drawn for the compressor 1 and its driving turbine 2. The ordinates represent compressor power (i. e. output power of the turbine 2 or input power to the compressor 1, these powers being equal). The abscissae represent mass flow. In Fig. 3a, which is drawn for the power turbine 5, the ordinates represent pressure ratio for the power turbine and the abscissae represent mass flow.

Figure 5:
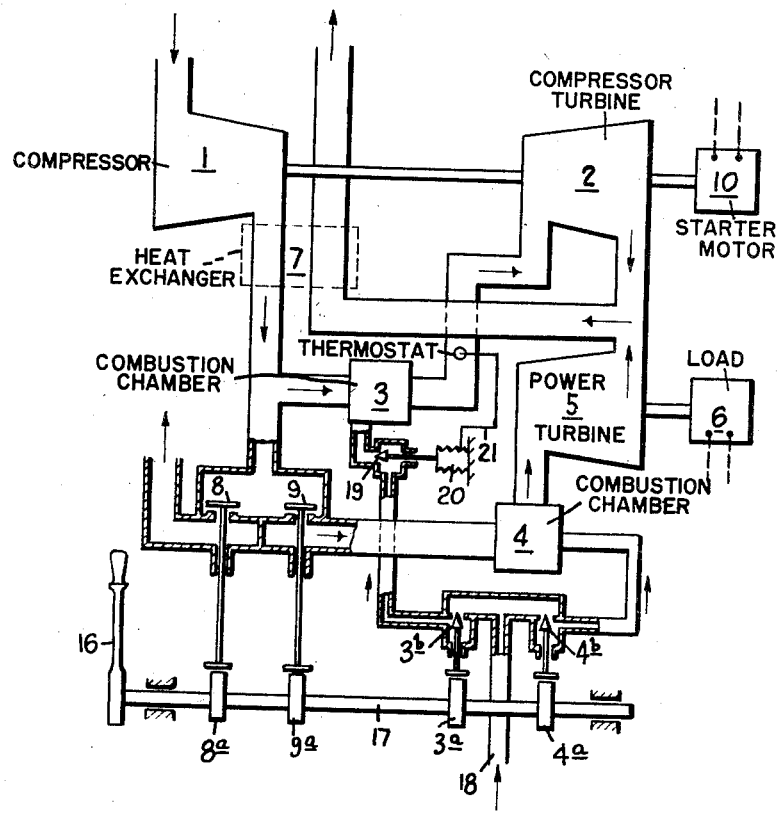

Fig. 4 shows a control device common to the combustion chambers of two turbines in series flow arrangement operated by a single handwheel. Fig. 5 shows a similar control device common to the combustion chambers of two turbines in parallel flow arrangement.

Referring first to Fig. 1, a compressor 1 delivers some of its compressed air output through a combustion chamber 3 into a turbine 2, which is mechanically coupled to and drives the compressor 1. A starting motor 10 is also coupled to compressor 1 and turbine 2. The remainder of the compressed air output of compressor 1 passes through a combustion chamber 4 and so to a turbine 5 which generates the useful external power by driving a load 6, which may for instance be the generator of an electric ship propulsion system. The exhaust gases from the turbines pass through a heat exchanger 7 which raises the temperature of the air delivered by the compressor 1 before it passes to the combustion chambers 3 and 4. A throttle valve 9, normally fully open, and a blow-off valve 8, normally closed, are provided in the positions shown.

In Fig. 2, the chain-dotted line AO is the surging line of the compressor and the lines AC, BD, and EF are each constant speed characteristics of the compressor. The lines GH and JK are constant inlet temperature lines for the compressor turbine 2, which can be determined experimentally. Line GH represents a higher temperature than line JK. In Fig. 3, the lines LM, NO and PQ are constant inlet temperature lines for the power turbine 5, line LM being for the highest temperature; and the lines RS, TU and VW are lines of constant power output. The design points are X in Fig. 2 and X' in Fig. 3.

It will be seen by reference to Fig. 2 that in order to maintain stable operation at reduced powers it is necessary to prevent the inlet temperature of the compressor turbine 2 from decreasing more than very slightly. In order to keep away from the surging line AO over a substantial range of power reduction, it is preferable to maintain this inlet temperature constant, or alternatively to increase it slightly as power is reduced. This is effected as far as possible, in the system according to this embodiment of the invention, by reducing the inlet temperature to power turbine 5 first, at the same time reducing the fuel supply to combustion chamber 3 only enough to maintain the inlet temperature to compressor turbine 2 substantially constant or to allow it to rise only to such slight extent as may be permissible. This procedure will continue until the fuel supply to combustion chamber 4 has been reduced substantially to zero. The operation of the power turbine during this procedure is represented by the line X'Y' in Fig. 3 and the operation of the compressor 1 and its driving turbine 2 by the line XY in Fig. 2, the points Y and Y' representing the point at which no fuel is admitted to the combustion chamber 4.

Further reduction in load is effected by reducing the inlet temperature to the compressor turbine 2 until a point is reached when any further such reduction will involve the danger of surging. The lines YZ and Y'Z' represent the operation of the plant thus obtained. It will be seen that the selected limit point Z is very near to the surging line of the compressor.

Further reduction in load is effected by simultaneously opening the blow-off valve 8 and closing the throttle valve 9, these valves being respectively opened and closed gradually until zero load is obtained when the blow-off valve is fully opened and the throttle valve completely closed.

When arranged in the positions shown in Fig. 1a the valves 8 and 9 are only subjected to the relatively low temperature of the gas as it leaves the discharge of the heat exchanger 7 and enters the combustion chambers 3 and 4.

Referring now to Fig. 1a, a compressor 1 delivers its compressed air output through a combustion chamber 4 into a turbine 5, which generates the useful external power by driving a load 6. This load 6 may, for instance, be the generator of an electric ship propulsion system. The exhaust gases from turbine 5 are delivered through another combustion chamber 3 into a turbine 2, which is mechanically coupled to and drives the compressor 1. A starting motor 10 is also coupled to compressor 1 and turbine 2. The exhaust gases from turbine 2 pass through a heat exchanger 7 which raises the temperature of the air delivered by the compressor 1 before it passes to the combustion chamber 4. A throttle valve 9, normally fully open, a blow-off valve 8, normally closed, and a by-pass valve 11, normally closed, are provided in the positions shown.

In Fig. 2a, the chain-dotted line AO is the surging line of the compressor and the lines AC, BD and EF are each constant speed characteristics of the compressor. The lines GH and JK are constant inlet temperature lines for the compressor turbine 2, which can be determined experimentally. Line GH represents a higher temperature than line JK.

In order to keep away from the surging line AO over the whole range of power reduction down to zero, the fuel supplies to the two combustion chambers are regulated in the following manner:

Over the range represented by the line XY in Fig. 2a and X'Y' in Fig. 3a, fuel is supplied substantially to the power turbine combustion chamber 4 only, the quantity of fuel being gradually reduced as the operating conditions are changed from those represented by points X and X' towards those represented by points Y and Y'.

When the points Y and Y' are reached, this being at about three-quarters of full power output of power turbine 5, supply of fuel to compressor turbine combustion chamber 3 is begun. For the range represented by the line YZ in Fig. 2a and Y'Z' in Fig. 3a, the fuel supply to compressor turbine combustion chamber 3 is progressively increased, while that to power turbine combustion chamber 4 is progressively decreased. The points Z and Z' represent the conditions when the fuel supply to power turbine combustion chamber 4 has been reduced substantially to zero.

After points Z and Z' have been passed, further reduction of power is effected by progressive reduction of the fuel supply to compressor turbine combustion chamber 3 until the operating conditions approach too closely to the surging line of the compressor. Further reduction in load is then effected by manipulation of throttle valve 9, blow-off valve 8 and by-pass valve 11.

In the system as described with reference to Figs. 1, 2 and 3 and 1a, 2a and 3a respectively, the fuel supply to the combustion chamber of the power turbine, or to both combustion chambers respectively, are completely cut off under certain conditions of operation. It will be preferable in practice to keep a small supply of fuel to each combustion chamber at all times so that it will not require to be re-ignited when the operating conditions are changed. Such a small supply will not, however, materially affect the nature of the system.

One method of carrying into effect the control system in both embodiments according to the invention is to provide a single handwheel or control lever which operates cams or other devices in such a way that the fuel supplies to the two combustion chambers 3 and 4 are reduced in the required relationship. The blow-off valve 8 and throttle valve 9 of both embodiments and the by-pass valve 11 of the embodiment illustrated in Fig. 1a may also be controlled by the same handwheel. Instead of a handwheel, a control lever, a hydraulic or pneumatic jack, or any mechanically or electrically operated gear may be used.

Fig. 4 shows such scheme for a series flow arrangement similar to that of Fig. 1a. The single control lever 16 operates a cam shaft 17 having cams 11a, 8a, 9a, 4a and 3a to operate the by-pass valve 11, blow-off valve 8, throttle valve 9, as well as the fuel valves 4b and 3b controlling the fuel supply from the supply pipe 18 to the combustion chambers 4 and 3 respectively.

For the range between points X and Y, in the case of the parallel flow arrangement, it is necessary for the fuel supplies to both combustion chambers to be controlled simultaneously. Both may be placed under the control of the single handwheel throughout this range. Alternatively, however, the handwheel may, over this range, control the supply to combustion chamber 4 only, and may then, after point Y is passed, change over to control the supply to combustion chamber 3; while for the range XY, the fuel supply to combustion chamber 3 is controlled by a thermostatic device responsive to inlet temperature of compressor turbine 2.

Fig. 5 shows such a scheme for a parallel flow arrangement corresponding to Fig. 1.

A valve 19 is controlled by a capsule 20 which is in connection through pipe 21 with the pipe connecting the combustion chamber 3 with the compressor turbine 2. The pressure and temperature in that pipe rise with increasing inlet temperature of the turbine 2 and cause the capsule 20 to extend and to restrict the flow of fuel through valve 19. Obviously the capsule could be replaced by any other well known pressure or temperature responsive device. Otherwise the components of this scheme correspond to those having the same reference numerals of Fig. 4. The device 19, 20, 21, can be omitted if the cam 3a is so shaped as to control the fuel supply over the whole range.

What I claim as my invention and desire to secure by Letters Patent is:

1. A gas turbine power plant comprising in combination: a turbine connected to deliver useful power, a mechanically independent second turbine, a separate combustion chamber for each of the said turbines, a dynamic compressor in driving connection with the said second turbine and a connection between said compressor and both said combustion chambers for delivering compressed air in parallel to the same, a separate fuel control valve for each of the said combustion chambers, a control means common to the said separate fuel control valves, connecting means positively connecting the said control means to the said valves, the said control means through said connecting means in one extreme position fully opening both the said fuel control valves, in an intermediate position substantially closing the fuel control valve of the combustion chamber for the power delivering turbine while substantially keeping open the fuel control valve of the combustion chamber for the compressor driving turbine, and in the other extreme position fully closing both said fuel control valves, with gradual transitions from one extreme position through the said intermediate position to the other extreme position, a blow-off valve connected between the said dynamic compressor and the said combustion chambers, a throttle valve connected between the said dynamic compressor and the combustion chamber of the said power turbine, a thermostat in thermal connection with the entrance to the said compressor driving turbine, a fuel valve in series connection with the said fuel control valve to the combustion chamber of the said compressor driving turbine and in operative connection to the said thermostat in a sense of closing when the temperature in said entrance rises, the said connecting means connecting the said control means to the said valves including a cam-shaft, and cams arranged on the said cam-shaft positively operating the said blow-off valve, the said throttle valve and the said fuel control valves in a predetermined succession.

2. A gas turbine power plant comprising in combination: a high pressure turbine connected for delivering useful power, a mechanically independent low pressure turbine in series flow connection with the said high pressure turbine, a separate combustion chamber connected to the entrance of each of the said turbines, a dynamic compressor driven by the said low pressure turbine and supplying compressed air to the combustion chamber of the said high pressure turbine, a separate fuel control valve for each of the said combustion chambers, a control means common to the said separate fuel control valves, connecting means positively connecting the said control means to the said fuel control valves, the said control means through the said connecting means in one extreme position fully opening the fuel control valve to the combustion chamber for the high pressure turbine and fully closing the fuel control valve to the combustion chamber for the low pressure turbine, in a first intermediate position opening the fuel control valve to the combustion chamber of the high pressure turbine to about 75% and beginning to open the fuel control valve to the combustion chamber of the low pressure turbine, in a second intermediate position fully closing the fuel control valve to the combustion chamber for the high pressure turbine and fully opening the fuel control valve to the combustion chamber of the low pressure turbine, and in the other extreme position fully closing both said fuel control valves, with gradual transitions from one extreme position through the said two intermediate positions to the other extreme position.

ERNEST GEORGE STERLAND.

References Cited in the file of this patent

UNITED STATES PATENTS

| Number | Name | Date |
| --- | --- | --- |
| 2,238,905 | Lysholm | Apr. 22, 1941 |
| 2,280,765 | Anxionnaz | Apr. 21, 1942 |
| 2,371,889 | Hermitte | Mar. 20, 1945 |

FOREIGN PATENTS

| Number | Country | Date |
| --- | --- | --- |
| 416,463 | Great Britain | Sept. 14, 1934 |
| 493,174 | Great Britain | Oct. 4, 1938 |
| 601,964 | France | Dec. 16, 1925 |